Feb. 27, 1968       R. R. LOVE       3,370,670
OSCILLATABLE AND LATERALLY SHIFTABLE DRIVE
AXLES PROVIDED WITH STEERABLE WHEELS
Filed Nov. 26, 1965       2 Sheets-Sheet 1

INVENTOR
RICHARD R. LOVE

BY Kenyon, Palmer, Stewart & Estabrook

ATTORNEYS.

INVENTOR
RICHARD R. LOVE

United States Patent Office 3,370,670
Patented Feb. 27, 1968

3,370,670
OSCILLATABLE AND LATERALLY SHIFTABLE
DRIVE AXLES PROVIDED WITH STEERABLE
WHEELS
Richard R. Love, Box 468, Buhl, Idaho 83316
Filed Nov. 26, 1965, Ser. No. 509,912
6 Claims. (Cl. 180—79.2)

This invention relates broadly to motor vehicles of the four-wheel driven type and more particularly to tractors and improvements in the mounting of the front axle and wheels.

In tractors of the two-wheel driven type as well as the four-wheel driven type, it has been the custom heretofore to employ a pair of large diameter wheels on the rear of the tractor and a pair of much smaller diameter wheels on the front of the tractor. This arrangement permits the front wheels to be employed as the steering wheels with the necessary clearance being provided to effect the proper steering of the tractor in the conventional manner, while the larger diameter rear wheels are utilized to develop traction in order to effect the desired pull of the tractor vehicle. Thus, in a four-wheel drive tractor wherein the front wheels are of the conventional size to properly effect the steering of the tractor, said small wheels do not develop very much traction and as a consequence, the pull of the tractor is increased only a slight amount over the pull that is normally developed in a conventional two-wheel driven tractor. While the use of large diameter wheels on both the front and rear axles of a four-wheel driven tractor would develop more traction and thus, result in a greater pull by the tractor, the ability to steer the tractor would be materially reduced particularly when endeavoring to move in a path other than a straight line as the larger diameter wheels on the front axle would require a greater clearance to effect the turning of the tractor during the steering thereof. While attempts have been made heretofore to increase the traction of the conventional small front wheels of a four-wheel driven tractor by employing tires having a large cross section, such efforts have not resulted in a true increase in the traction, as the traction developed by a tractor is dependent more on the diameter of the wheels employed rather than on the cross section of the tires. Thus, on four-wheel driven tractors the front wheels, with tires thereon, are usually of a maximum diameter that is commensurate with the designed turning radius of the tractor when taking into consideration the clearance that is necessary to effectively steer the tractor while at the same time employing front and rear axles of approximately the same length.

The present invention is directed to a four-wheel driven tractor having front and rear axles of substantially the same length and wherein large diameter wheels are employed in lieu of the small conventional front wheels. The diameter of the front wheels may readily approximate the diameter of the rear tractor wheels, yet through the particular manner of supporting or mounting the front axle on the frame of the tractor, sufficient turning clearance for the front wheels is readily provided to effectively steer the tractor. While the use of large diameter wheels on the front of a four-wheel driven tractor will increase the turning or steering effort, over what is required when using small conventional front wheels, it should be borne in mind that practically all of the heavy duty tractors utilize power steering. Thus, the increased steering effort occasioned through the use of large diameter wheels will be readily offset by said power steering, but the traction or pull of the tractor will be materially increased through the use of the large diameter front wheels.

One of the objects of the present invention is to provide a tractor having a pair of large diameter wheels carried by a front axle that is mounted on said tractor for movement laterally thereof whereby said wheels will have sufficient turning clearance for effectively steering said tractor.

Another object is to provide a tractor of the four-wheel driven type having an assembly mounted on the front end of the tractor frame for engaging and supporting a front axle having large diameter wheels mounted thereon whereby said axle may be moved laterally of the frame to permit the turning of said wheels during the steering of said tractor.

Another object is to provide a tractor of the four-wheel driven type wherein the front axle is carried by a tie rod that is pivotally mounted on the tractor to permit the axle to be shifted laterally of the tractor.

A further object is to provide a tractor of the four-wheel driven type having a front axle mounting that enables large diameter steering wheels to be employed on said axle whereby the traction or pull of said tractor is materially increased.

Other objects and advantages, more or less ancillary to the foregoing in the manner in which all of the various objects are realized will appear in the following description, which, when considered in connection with the accompanying drawings, sets forth the preferred embodiment of the invention.

Referring to the drawings wherein the preferred embodiment of the invention is illustrated:

Figure 1:
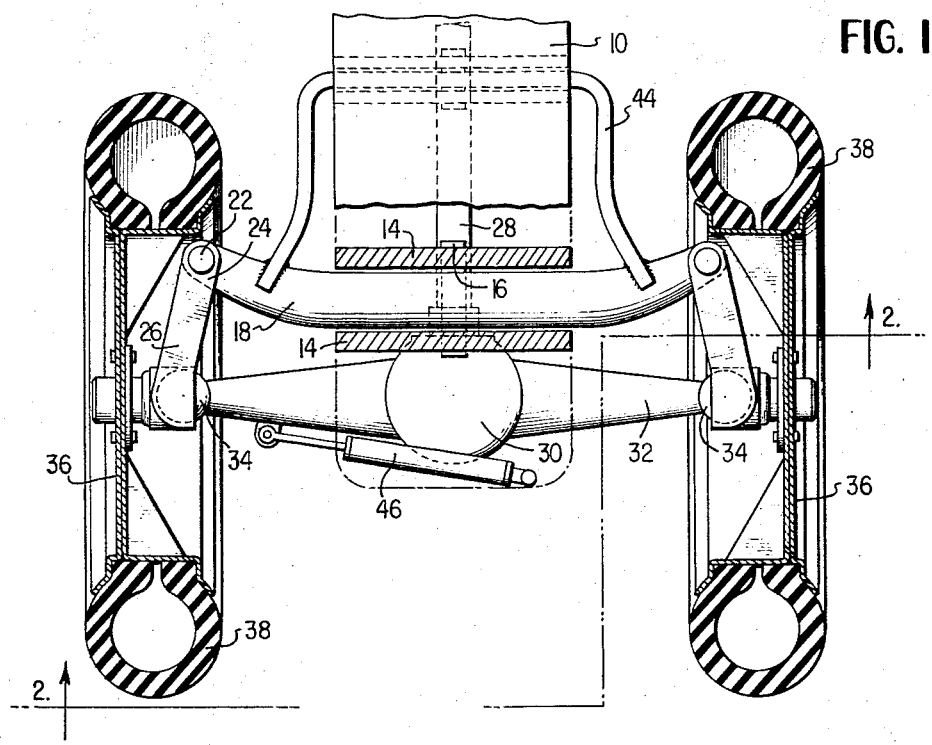
FIGURE 1 is a plan view, partly in section, of the front or forward end portion of a tractor embodying the present invention.
Figure 2:
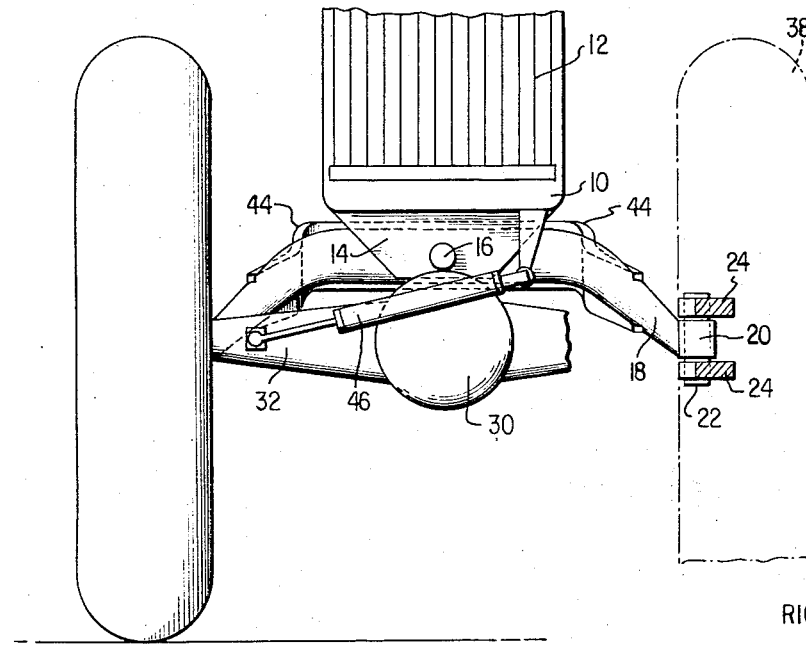
FIGURE 2 is an elevational view, partly in section, of the forward or front end of a tractor embodying the present invention, the view being taken on the line 2—2 of FIGURE 1.
Figure 3:
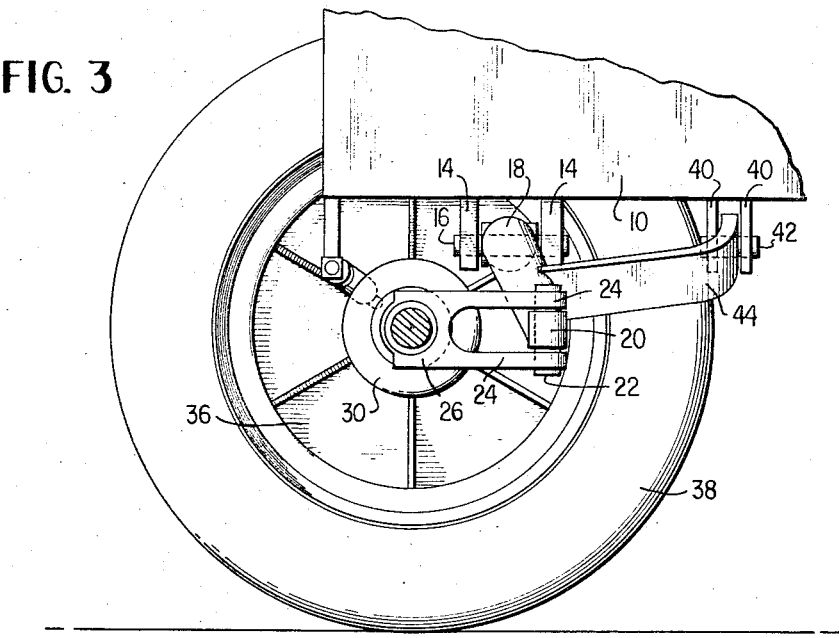
FIGURE 3 is a side elevational view of a fragmentary portion of the front or forward end of a four-wheel driven tractor showing the manner in which the front axle is mounted upon the tractor frame.

Referring to the drawings, there is shown in FIGURES 1 and 3 the forward or front end portion of a conventional tractor of the four-wheel driven type embodying a frame or chassis 10 having the usual radiator 12 mounted thereon. Inasmuch as the engine, rear wheels and drive mechanism connecting said wheels to the engine do not form any part of the present invention, they have not been illustrated, but it should be readily understood that these parts are conventional in their design and mode of operation.

The frame 10 has secured thereto, by any suitable means, a pair of depending brackets 14 that are arranged in spaced parallel relation to one another and extend transversely of said frame. The brackets 14 are provided with aligned apertures for receiving the ends of a pin or rod member 16 which is mounted in said apertured brackets, in any suitable manner, so as to have a pivotal or oscillatory movement with respect thereto. The pin 16 has secured thereto or formed integrally therewith a tie rod member 18, which extends between the brackets 14 transversely of the frame member 10 of the tractor. The tie rod member 18 extends outwardly from between the brackets 14 so as to project beyond the sides of the tractor frame 10 with each end of the tie rod terminating in a bearing 20, FIGURE 3. The bearing 20 has a pin 22 journalled therein with the ends of said pin projecting above and below the bearing to receive the bifurcated end portions 24 of the steering arms 26.

The tractor of the present invention is provided with a conventional forwardly extending drive shaft 28 which terminates in a forward differential unit 30. The drive shaft 28 is provided with conventional universal joints and a slip shaft connection, not shown, while the differential unit 30 forms part of a conventional forward drive axle 32. The respective ends of the drive axle 32 are provided with universal knuckles or joints 34, of any conventional type, which knuckles have wheels 36 mounted thereon. The universal joints or knuckles 34 have connected thereto the steering arms 26 for effectively turning and steering the wheels 36, which have mounted thereon large diameter tires 38. The tires 38 may be of a diameter commensurate with that of the tires that are customarily mounted upon the rear wheels of a tractor while the cross section of the tires 38 may be equal to or less than the cross section of the tires that are commonly employed on the rear wheels of a conventional tractor. The wheels 36 are driven in the customary manner through the differential unit 30 and axle 32 and universal knuckles or joints 34 with the motive power to effect such drive being delivered to the differential unit by the drive shaft 28.

The tractor frame 10 has affixed thereto, in any suitable manner, a pair of depending arms 40, FIGURE 3, which extend transversely of the frame 10 in spaced parallel relation to the brackets 14. The arms 40 are provided with aligned apertures for receiving a pin 42 that is mounted, in any suitable manner, in the arms 40 so as to be capable of oscillating or pivoting with respect to said arms. The pin 42 is affixed to the central or web portion of a channel-shaped reinforcing member 44 so that with the pin mounted in the apertures in said arms 40, the web or channel portion will be positioned between said arms beneath the tractor frame. The leg portions of the channel-shaped reinforcing member 44 are spaced outwardly from the sides of the tractor frame 10 and project towards the front of the frame with the ends of the reinforcing member being secured to the outer end portions of the tie rod 18 by any suitable means such as welding. The reinforcing member 44 is thus mounted between the depending arms 40 by means of the pin 42 and has a pivotal or oscillatory movement with respect to said arms in the same manner that the tie rod 18 has a pivotal or oscillatory movement with respect to the depending brackets 14 by means of the pin 16. Thus, the tie rod 18 and reinforcing member 44 constitute a supporting assembly for the front axle and wheels of the tractor so in conjunction with the steering arms 26 said axle and wheel assembly is capable of being shifted laterally of the tractor frame during the turning of the front steering wheels. The forward drive axle 32 has one end of a conventional hydraulic piston-cylinder unit 46 affixed thereto with the other end of said unit being connected, by suitable arms and gear segments, not shown, to a conventional steering mechanism, not shown.

The tie rod 18 and reinforcing member 44 in conjunction with the pins 16 and 42 must be of sufficient strength to effectively support and carry the weight of the front axle and wheel assembly as well as withstand the torque and other stresses and strains that would be imposed upon them.

Figure 4:
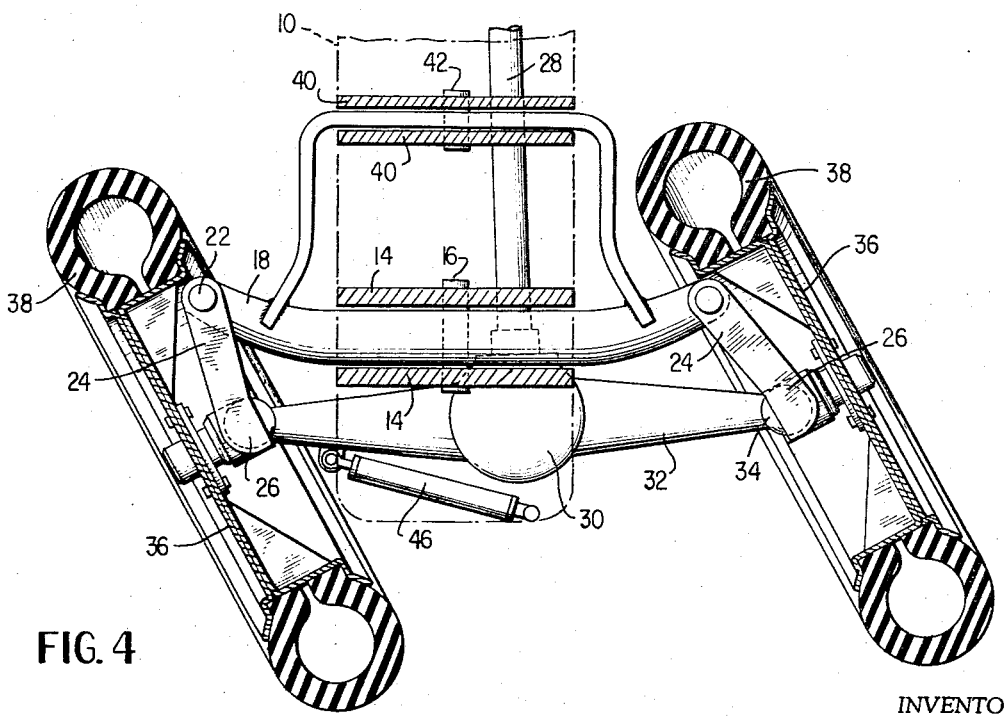
FIGURE 4 is a view similar to FIGURE 1 showing the axle and front wheels of the tractor in the position that would be assumed by said wheels when the tractor is making a left turn.

The tractor vehicle is propelled in the customary manner by means of a conventional power plant, not shown, which is designed to drive the conventional rear wheels of a tractor, not shown, as well as the forward wheels 36 through the drive shaft 28 and forward differential unit 30 and drive axle 32. The steering mechanism is of the conventional type and upon rotation of the steering wheel, not shown, the hydraulic piston-cylinder unit 46 will be actuated, which movement will cause the axle 32 to be shifted either to the right or to the left, when viewing FIGURE 1, dependent upon the direction in which the steering wheel is rotated. As shown in FIGURE 4, the hydraulic piston-cylinder unit 46 has been actuated so as to move the axle 32 to the left so that the wheels will assume and take the position for making a left-hand turn by having the steering arms 26 pivot about the bearings 20 formed on the outer ends of the tie rod member 18. Thus, the reinforcing member 44 and tie rod member 18 acts as a unitary supporting assembly or member for the axle 32 and wheels 36 and by pivotally connecting the end of the steering arms 26 to the bearings 20 by means of the pins 22, the wheels 36 and axle 32 can be moved laterally or sideways of the tractor frame 10 upon the actuation of the piston-cylinder unit 46. This lateral or sidewise movement of the front wheels 36 and axle 32 permit the use of large wheels and tires on the forward end of the tractor as sufficient clearance is provided for the turning of the wheels 36 in the steering thereof and thus through the use of large wheels and tires the traction and pull that is developed by the tractor is materially increased. Thus, the forward or front wheels of the tractor vehicle as well as the differential unit 30 and forward axle 32 are in a sense floating with respect to the forward end of the tractor due to the manner in which the wheels and axle 32 are pivotally connected to the outer ends of the tie rod member 18 by means of the steering arms 26. The sidewise or lateral movement of the front axle 32 and the differential unit 30 is compensated for by the conventional universal joints and slip shaft connection that is employed in conjunction with the forwardly extending drive shaft 28. In addition to the foregoing, the pivotal mounting of the tie rod member 18 and the reinforcing member 44 which function as a supporting assembly for the forward axle 32 and wheels 36 compensate for any undulating movement of the wheels and axle as the wheels move over any uneven terrain while traveling in a straight-forward direction or in a left-hand or right-hand turn.

Although the foregoing description is necessarily of a detailed character in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A front end suspension and steering system for a tractor vehicle of the four-wheel driven type including in combination a frame having a front and rear end, an axle, a wheel rotatably connected to each end of said axle, a member pivotally connected to said frame rearwardly of the front end and extending transversely of and beneath said frame, an arm pivotally connected to each end of said member and arranged to project towards the front end of said frame, each of said arms connected to an end of said axle for positioning said axle beneath and rearwardly of the front end of said frame and in spaced parallel relation to said member for supporting said frame.

2. A front end suspension and steering system as set forth in claim 1 wherein a piston-cylinder unit is connected to said axle and steering means connected to said piston-cylinder unit for moving said axle laterally of said frame contemporaneous with the turning of said arms about the ends of said member.

3. A front end suspension and steering system as set forth in claim 1 wherein the ends of said member are formed with bearings for the reception of pins and each arm is provided with a bifurcated end for pivotally engaging said pins and thereby comprising the pivotal connections of said arms to said member.

4. A front end suspension and steering system as set forth in claim 1 wherein a pair of depending brackets are secured to said frame in spaced parallel relation to one another and arranged to extend transversely of said frame rearwardly of the forward end, and a pin extending through said member and engaging said brackets for pivotal movement with respect thereto.

5. A front end suspension and steering system as set forth in claim 4 wherein a pair of depending arms are secured to said frame adjacent to but rearwardly of said brackets, a second member pivotally connected to said arms and extending transversely of said frame in spaced parallel relation to said first member, the ends of said second member being secured to said first member.

6. A front end suspension and steering system as set forth in claim 5 wherein a piston cylinder unit is connected to said axle and steering means connected to said unit for moving said axle laterally of said frame.

References Cited

UNITED STATES PATENTS

| | | | |
|---|---|---|---|
| 1,405,159 | 1/1922 | Polaski et al. | 180—42 |
| 2,730,186 | 1/1956 | Morgen | 280—95 |
| 2,733,932 | 2/1956 | Stidham | 280—95 |

FOREIGN PATENTS

| | | |
|---|---|---|
| 165,374 | 2/1950 | Austria. |
| 1,377,228 | 9/1964 | France. |
| 801,249 | 12/1950 | Germany. |
| 860,276 | 2/1961 | Great Britain. |

A. HARRY LEVY, *Primary Examiner.*